April 7, 1936.　　　　　J. LINER　　　　2,036,419
OPENING CLOSURE SEALS
Filed June 3, 1933
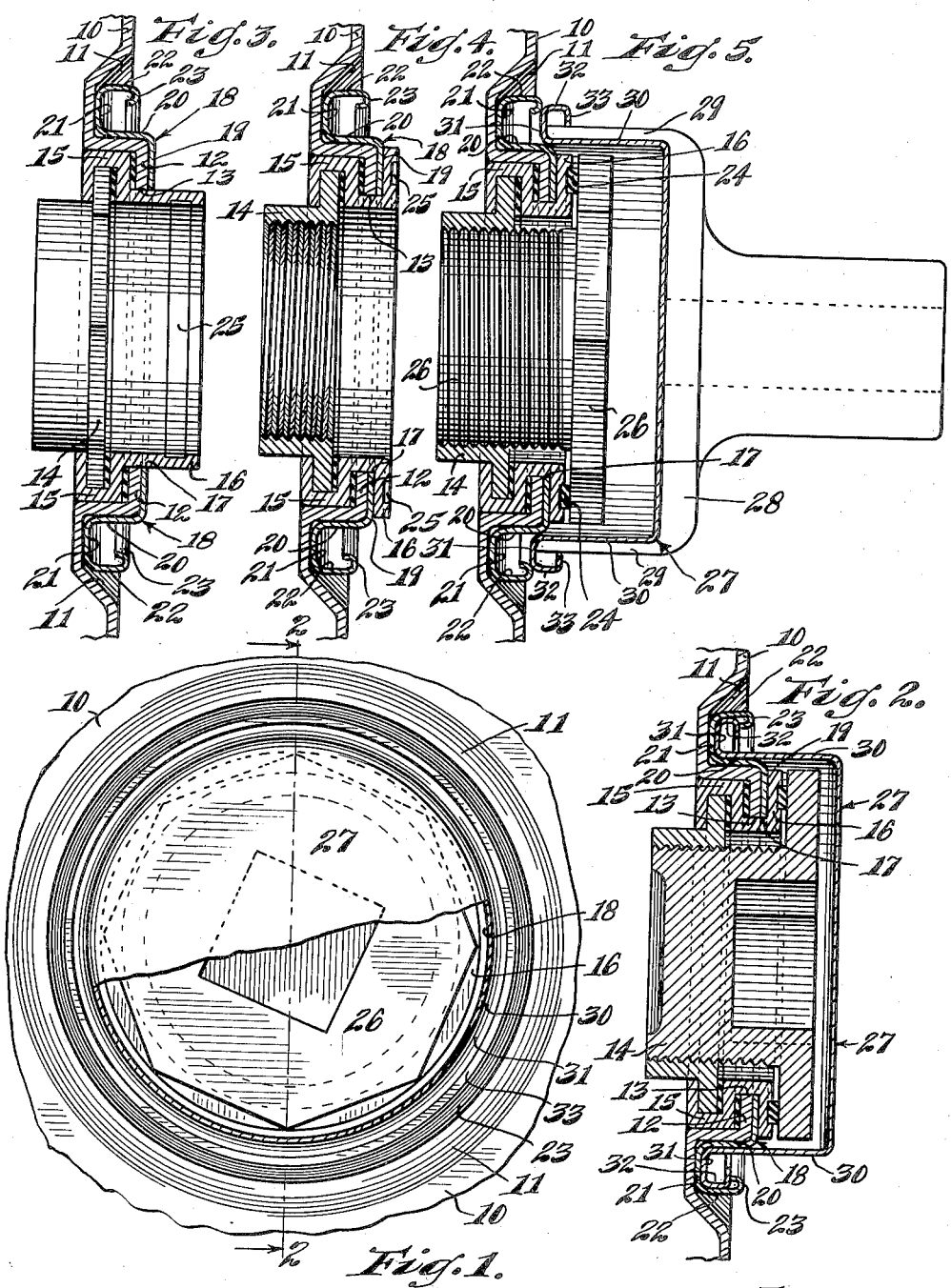

Patented Apr. 7, 1936

2,036,419

UNITED STATES PATENT OFFICE 2,036,419

OPENING CLOSURE SEALS

Julius Liner, Chicago, Ill., assignor of one-half to Joshua R. H. Potts, Chicago, Ill.

Application June 3, 1933, Serial No. 674,171

3 Claims. (Cl. 220—39)

My invention relates to opening closure seals, and has for an object the provision of a seal which may be used to prevent the undetected removal of a closure member, and also the provision of such a seal which will prevent leakage even though the closure member should become displaced from its seat. Another object is the provision of a seal, part of which may be destroyed at each removal of the closure member, and the other part of which may be used through the entire life of the container and yet operate efficiently. My invention is also simple to manufacture and simple to use.

Other objects will appear hereinafter.

The preferred construction of my invention may be best understood by reference to the accompanying drawing, in which:

Fig. 1 is a top plan view of my seal in position and protecting a closure plug; parts are broken away to illustrate the underlying construction;

Fig. 2 is a sectional view, taken substantially on the line 2—2 of Fig. 1, and illustrates the complete seal in place and shows more clearly the relation of the various parts of the closure and container wall;

Fig. 3 is a view similar to Fig. 2, and shows the preferred manner of attaching my seal retaining member around the opening to be protected;

Fig. 4 is a view similar to Fig. 3, and illustrates the parts in a further stage of completion than does Fig. 3; and Fig. 5 is a view similar to Fig. 4, and shows the seal cap about to be placed in final position, and shows also the type tool which I preferably employ in affixing my seal cap.

As illustrated in Fig. 3, a container wall 10, having a depressed circular groove 11 and upstanding shoulder 12 around an aperture 13, may be employed. Shoulder 12 may be of a polygonal formation so as to prevent the turning of a polygonally flanged socket member 14 held by anchoring member 15 which may also have a polygonal perimeter of appropriate shape to embrace the flange of socket member 14. The upwardly extending cylindrical part 16 of anchoring member 15 may be inserted through aperture 13 of wall 10, and through aperture 17 of my seal retaining member 18. The end 16 may then be peaned down over the perimeter of aperture 17, and thus hold the adjacent portions of seal retaining member 18 between shoulder 12 and end 16.

Seal retaining member 18 may be circular in formation, and thus have a flat circular shelf 19, depending inside wall 20, a substantially flat bottom wall 21 curving into upstanding outside wall 22 which finally curves into a downwardly extending retaining lip 23. It can be seen that the preferred form illustrated is made so that the side walls and bottom wall of my seal retaining member seat in circular groove 11, and thus are protected because the height of shoulder 12 causes shelf 19 and portion 16 to extend upwardly a sufficient distance so that in cooperation with wall 10 there is small likelihood of a direct blow or weight being received by seal retaining member 18.

A gasket 24 may be placed in groove 25 of anchoring member 15, and a screw-threaded plug 26 turned into flange socket 14. After plug 26 is tightened thoroughly, danger of leakage is remote unless someone tampers with the plug, or it becomes loose through expansion and contraction or jars or the like, and in order to prevent tampering and leakage, I place a seal cap 27 over plug 26 with a tool 28 which has depending fingers 29 adapted to embrace closely the side walls 30 of cap 27. Adjacent the lower end of side wall 30 my cap curves outwardly and provides a substantially flat bottom wall 31, curves upwardly, and forms outer side wall 32, and then curves inwardly to form a substantially horizontal inwardly extending flange. It can be seen that side wall 32 and bottom wall 31 seat very closely to side wall 22 and bottom wall 21 of seal retaining member 18, and that inwardly extending flange 33 is held beneath retaining lip 23 after cap 27 has been driven downwardly to the bottommost limit. The preferred material for making cap 27 is thin gauge metal, and may be destroyed somewhat easily so as to remove plug 26, and it is necessary to destroy the cap 27 in order to effect such removal, because of the strong union between retaining member 18 and cap 27.

In order to provide a thoroughly fluid-tight closure, and thus remove the danger of leakage caused by loosening of plug 26, I preferably pour a quantity of liquid rubber in my seal retaining member where it rests on bottom wall 21, and when cap 27 is driven into place the lower side of bottom wall 31 comes in contact with the liquid rubber and thus forms a fluid-tight joint.

It is thought that the operation and construction of my closure seal is obvious from the foregoing, and that no further description is needed. However, I preferably employ a thicker gauge metal to form retaining member 18 so that it may be used repeatedly without replacement, and, as I have mentioned before, since cap 27 is of thin gauge metal, it cannot damage retaining member 18.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A device of the character described, comprising a retaining ring surrounding an opening in a container and secured to the container wall and having an upwardly, inwardly, and downwardly curved side wall, and a seal cap with a downwardly depending side wall, the lower portion thereof being bent outwardly, upwardly, and inwardly, said inwardly bent portion of said cap being adapted to fit under and be held in place by the downwardly curved side wall of said retaining ring.

2. A device of the character described, comprising a retaining ring secured to a container wall and surrounding an opening in said wall, said ring having a flat circular shelf surrounding said opening to be sealed, a wall depending from said shelf, the lower extremity of said wall being bent outwardly, upwardly, inwardly, and downwardly to provide a sealing composition retaining groove, and a seal cap having a depending side wall whose lower portion extends outwardly, upwardly, and inwardly, said downwardly bent portion of said retaining ring being adapted to impinge on said inwardly bent portion of said seal cap and restrain said cap from vertical movement.

3. A device of the character described comprising a retaining ring secured to a container and surrounding an opening in said wall, said ring having a flat circular shelf surrounding said opening to be sealed, a wall depending from said shelf, the lower extremity of said wall being bent outwardly, upwardly, inwardly, and downwardly to provide a sealing composition retaining groove, and a seal cap having a depending side wall whose lower portion extends outwardly, upwardly, and inwardly, said downwardly bent portion of said retaining ring being adapted to impinge on said inwardly bent portion of said seal cap and restrain said cap from movement, and a sealing composition adapted to be retained in said groove and to form a fluid type joint between the sealing cap and the retaining ring.

JULIUS LINER.